US006782089B1

(12) United States Patent
Blackburn et al.

(10) Patent No.: US 6,782,089 B1
(45) Date of Patent: Aug. 24, 2004

(54) BOOKMARK SYSTEM AND METHOD WITHIN AN INTELLIGENT NETWORK

(75) Inventors: Connie Blackburn, Milpitas, CA (US); Joel Brand, Milpitas, CA (US); Douglas William Varney, Naperville, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/512,839

(22) Filed: Feb. 25, 2000

Related U.S. Application Data
(60) Provisional application No. 60/122,170, filed on Feb. 26, 1999.

(51) Int. Cl.[7] .............................. H04M 3/42; H04M 7/00
(52) U.S. Cl. .............................. 379/212.01; 379/221.09; 379/211.02
(58) Field of Search ........................ 379/212.01, 210.01, 379/211.02, 201.01, 207.02, 221.1, 221.01, 221.08, 221.09, 221.13, 221.11, 221.12

(56) References Cited

U.S. PATENT DOCUMENTS

| | | | |
|---|---|---|---|
| 4,625,081 A | 11/1986 | Lotito et al. | 379/88 |
| 5,058,152 A | 10/1991 | Solomon et al. | 379/67 |

(List continued on next page.)

FOREIGN PATENT DOCUMENTS

| | | | | |
|---|---|---|---|---|
| EP | 0 481 683 A2 | 4/1992 | ............ | H04Q/7/04 |
| EP | 0543235 A2 | 5/1993 | ............ | H04Q/3/62 |
| EP | 0 679 005 A1 | 10/1995 | ............ | H04M/3/50 |
| EP | 0 856 979 A2 | 8/1998 | ............ | H04M/3/50 |
| EP | 0 905 959 A2 | 3/1999 | ............ | H04M/7/00 |

(List continued on next page.)

OTHER PUBLICATIONS

Deixler, Lyle, "Iwatsu's New ADIX–S, This starter phone system can grow with your company", Mar. 1997, p. 44–45, Teleconnect, vol. 15, Issue 3.

T. Yoshida, N. Terashima, "A Conceptual Study of a Voice Conversation Facility in Intelligent NW Voice Mail," May 27–Jun. 1, p. 129–136, Stockholm, Sweden.

Chung–Hsien Wu, et al., "Speech Activated Telephony Email Reader (SATER) Based on Speaker Verification and Text–To–Speech Conversion", Institute of Information Engineering, IEEE Transactions on Consumer Electronics, vol. 43, No. 3, Aug. 1997, pp. 707–716.

Cristina Delogu, et al., "Spectral Analysis of Synthetic Speech and Natural Speech with Noise Over the Telephone Line", Instituto Superiore Poste e Telecommunicazioni, v.le Europa 190, 00144 Roma, p. 1409–1412.

Masanobu Abe, et al. "A New Framework to Produce Multimedia Content by Combining Synthesized Speech and Moving Pictures in the WWW Environment", NTT Cyber Space Labs, Japan, 1999, pp. 611–616.

*Primary Examiner*—Benny Tieu
(74) *Attorney, Agent, or Firm*—Haverstock & Owens LLP

(57) ABSTRACT

A bookmark system and method automatically stores a subaddress associated with a particular user and location within a presently connected server. The subaddress preferably indicates a location where the user exited the server. This bookmark system and method seamlessly places the user back to this subaddress within the server when the user reconnects to the server. The bookmark system and method is preferably configured to operate within an Intelligent Network service. By utilizing the bookmark system and method, the user is able to move from server to server and automatically return to a subaddress where the user previously exited the server. Further, the bookmark system and method does not require a call to be routed through a prior server in order for the user to return to the subaddress where the user previously exited the prior server.

8 Claims, 4 Drawing Sheets

U.S. PATENT DOCUMENTS

| | | | |
|---|---|---|---|
| 5,339,352 A | 8/1994 | Armstrong et al. | 379/58 |
| 5,406,616 A | 4/1995 | Bjorndahl | 379/59 |
| 5,471,521 A | 11/1995 | Minakami et al. | 379/88 |
| 5,479,489 A | 12/1995 | O'Brien | 379/67 |
| 5,487,111 A | 1/1996 | Slusky | 379/211 |
| 5,524,147 A * | 6/1996 | Bean | 379/266.03 |
| 5,537,464 A | 7/1996 | Lewis et al. | 379/114 |
| 5,539,807 A | 7/1996 | Ghisler et al. | 379/58 |
| 5,572,579 A | 11/1996 | Orriss et al. | 379/142 |
| 5,577,110 A | 11/1996 | Aquino | 379/201 |
| 5,583,920 A | 12/1996 | Wheeler, Jr. | 379/88 |
| 5,596,573 A | 1/1997 | Bertland | 370/474 |
| 5,625,682 A * | 4/1997 | Gray et al. | 379/207.16 |
| 5,668,863 A | 9/1997 | Bieselin et al. | 379/202 |
| 5,712,903 A | 1/1998 | Bartholomew et al. | 379/89 |
| 5,732,216 A | 3/1998 | Logan et al. | 395/200.33 |
| 5,737,725 A | 4/1998 | Case | 704/260 |
| 5,742,905 A | 4/1998 | Pepe et al. | 455/461 |
| 5,764,746 A * | 6/1998 | Reichelt | 379/210.01 |
| 5,850,629 A | 12/1998 | Holm et al. | 704/260 |
| 5,896,441 A * | 4/1999 | Akazawa et al. | 379/9 |
| 5,922,045 A | 7/1999 | Hanson | 709/206 |
| 5,970,133 A | 10/1999 | Salimando | 379/213 |
| 5,995,613 A | 11/1999 | Goel et al. | 379/221 |
| 6,016,336 A * | 1/2000 | Hanson | 379/88.23 |
| 6,061,432 A * | 5/2000 | Wallace et al. | 379/88.18 |
| 6,078,655 A | 6/2000 | Fahrer et al. | 379/209 |
| 6,084,892 A | 7/2000 | Benash et al. | 370/301 |
| 6,161,087 A | 12/2000 | Wightman et al. | 704/215 |
| 6,163,855 A | 12/2000 | Shrivastava et al. | 714/4 |
| 6,167,119 A | 12/2000 | Bartholomew et al. | 379/88.04 |
| 6,185,288 B1 | 2/2001 | Wong | 379/219 |
| 6,199,076 B1 | 3/2001 | Logan et al. | 707/501 |
| 6,226,289 B1 | 5/2001 | Williams et al. | 370/385 |
| 6,229,880 B1 | 5/2001 | Reformato et al. | 379/88.01 |
| 6,233,234 B1 | 5/2001 | Curry et al. | 370/356 |
| 6,233,315 B1 | 5/2001 | Reformato et al. | 379/88.01 |
| 6,282,270 B1 * | 8/2001 | Porter | 379/88.17 |
| 6,289,090 B1 | 9/2001 | Tessler et al. | 379/207 |
| 6,317,484 B1 | 11/2001 | McAllister | 379/88.02 |
| 6,330,308 B1 | 12/2001 | Cheston, III et al. | 379/88.04 |
| 6,381,325 B1 | 4/2002 | Hanson | 379/218.01 |
| 6,389,126 B1 | 5/2002 | Bjornberg et al. | 379/201.03 |
| 6,400,804 B1 * | 6/2002 | Bilder | 379/76 |
| 6,424,647 B1 | 7/2002 | Ng et al. | 370/352 |
| 6,427,002 B2 | 7/2002 | Campbell et al. | 379/88.01 |
| 6,442,169 B1 | 8/2002 | Lewis | 370/401 |
| 6,456,700 B1 | 9/2002 | Malik | 379/88.19 |
| 6,493,438 B1 | 12/2002 | Gross et al. | 379/114.22 |
| 6,650,737 B2 | 11/2003 | Finnigan | 379/88.02 |

FOREIGN PATENT DOCUMENTS

| | | | | |
|---|---|---|---|---|
| GB | 2 252 014 A | 7/1992 | | H04M/1/274 |
| JP | 10079785 | 3/1998 | | H04M/1/57 |
| WO | WO 98/09421 | 3/1998 | | H04M/3/42 |
| WO | WO 98/09422 | 3/1998 | | H04M/3/42 |
| WO | WO 98/11704 | 3/1998 | | |
| WO | WO 99/29083 | 6/1999 | | H04L/29/12 |

* cited by examiner

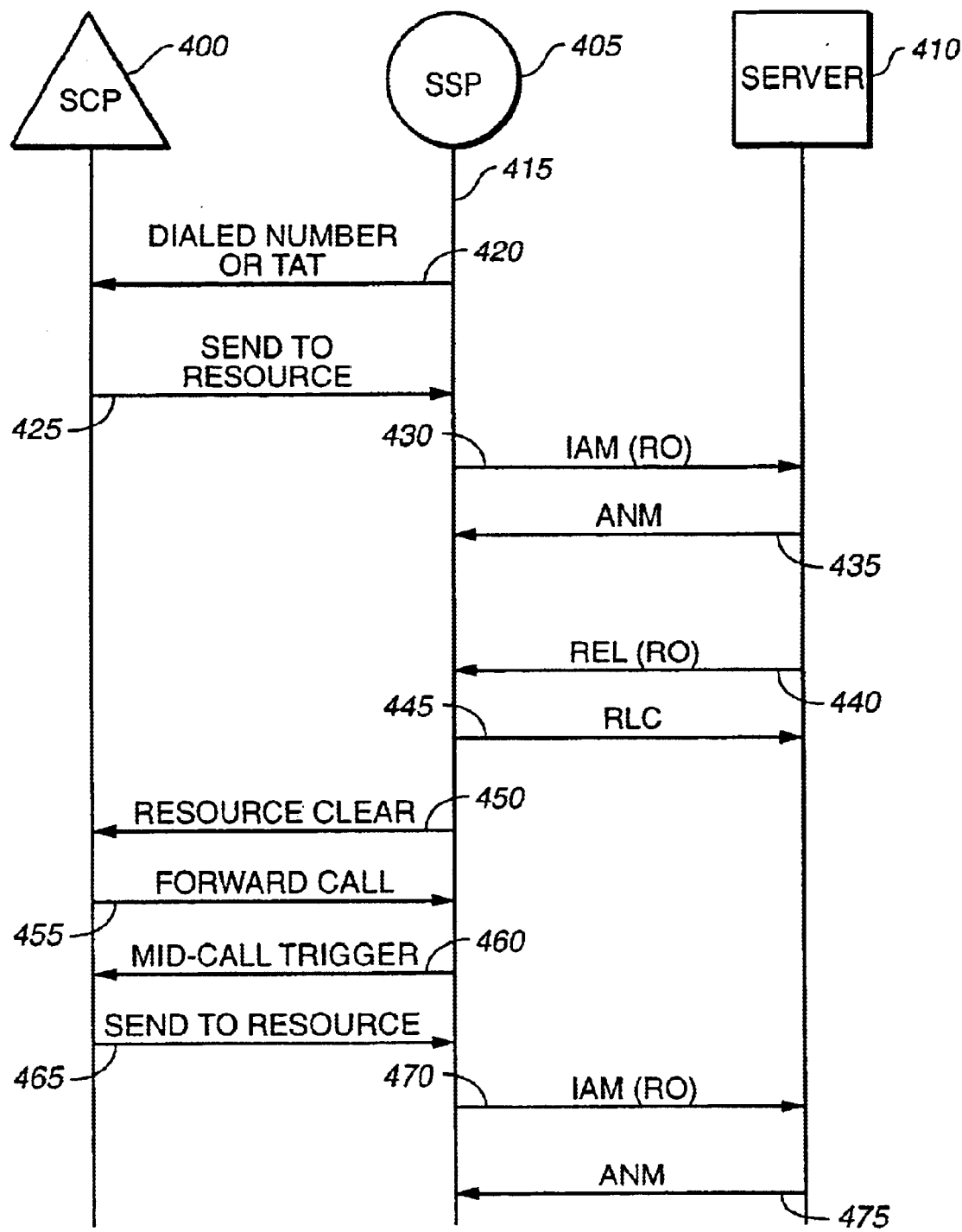
FIG._1
*(PRIOR ART)*

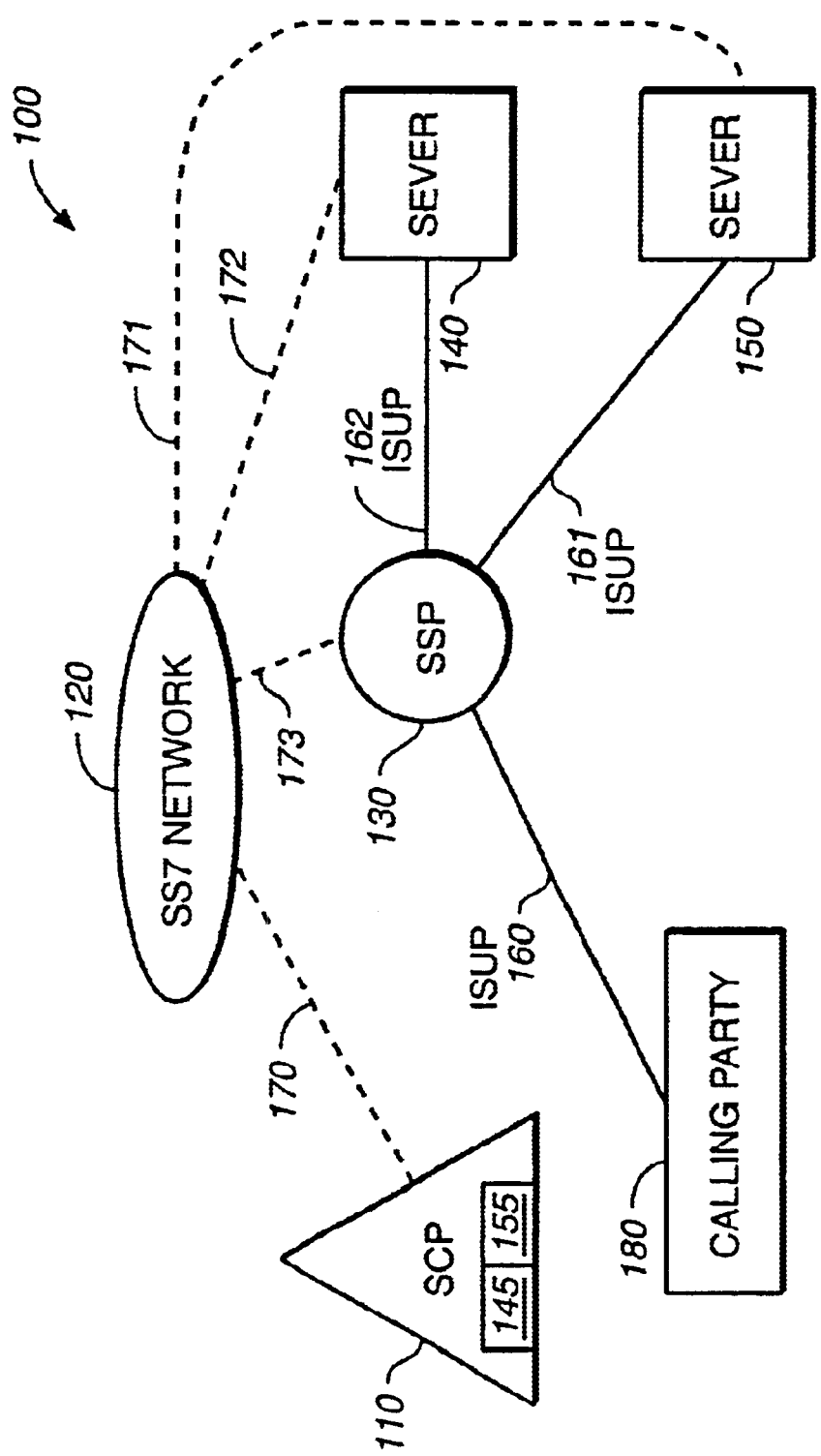
FIG._2

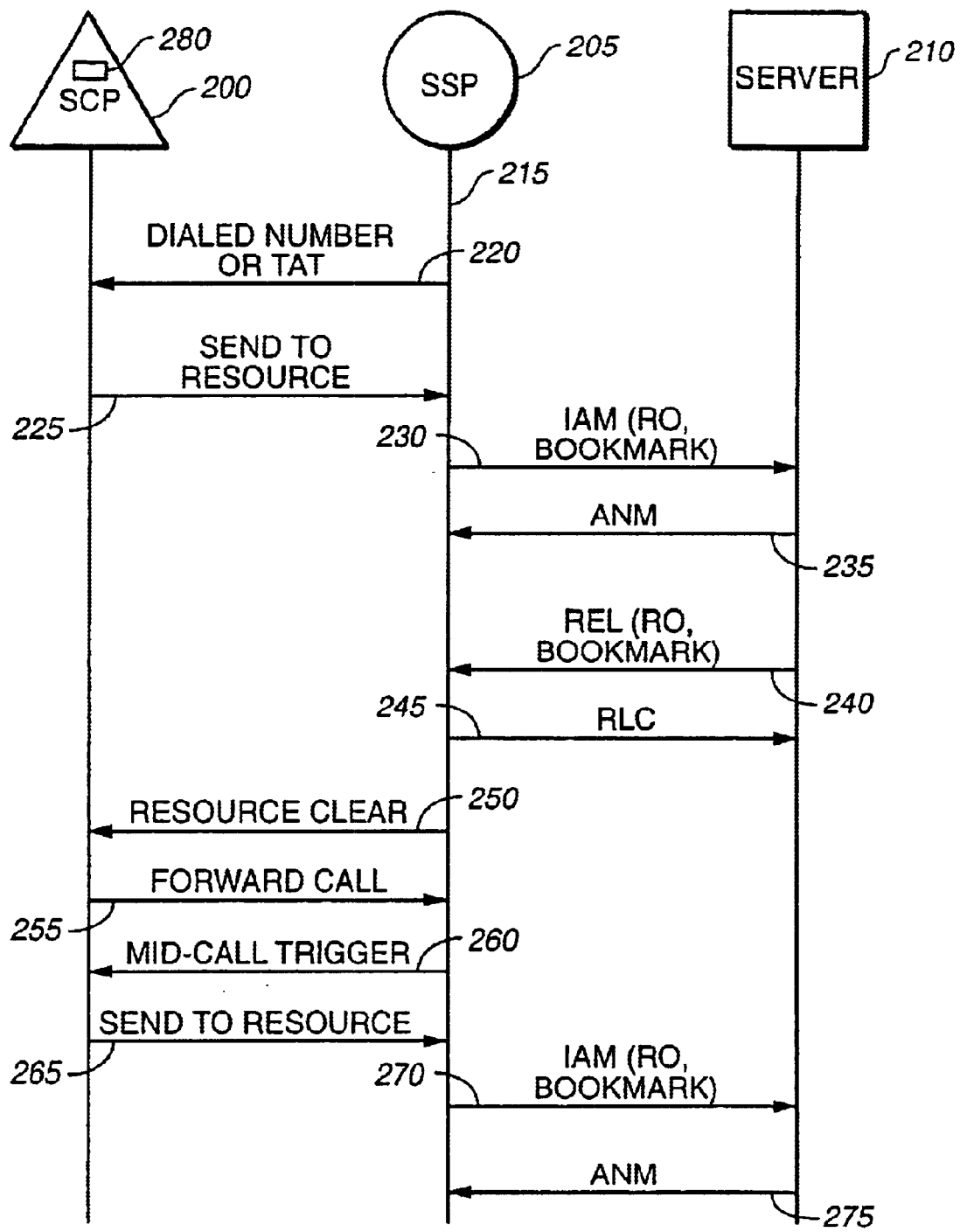
FIG._3

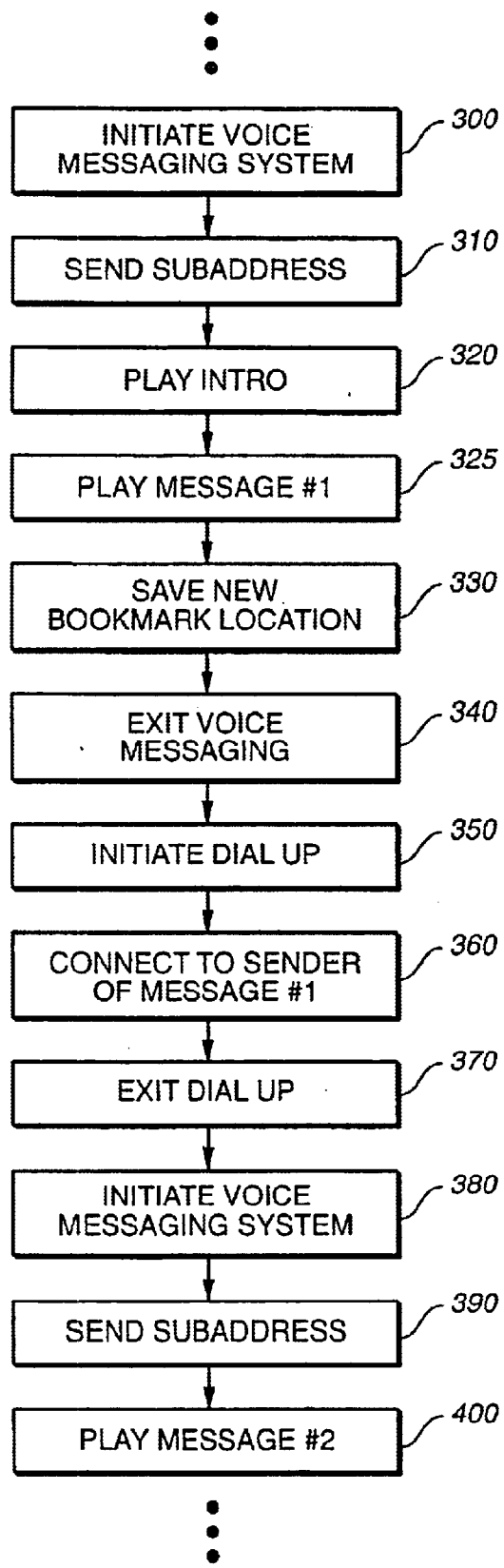
FIG._4

BOOKMARK SYSTEM AND METHOD WITHIN AN INTELLIGENT NETWORK

RELATED APPLICATIONS

This application claims priority under 35 U.S.C. § 119(e) of the co-pending U.S. provisional application Serial No. 60/122,170 filed on Feb. 26, 1999 and entitled "Bookmark System and Method Within An Intelligent Network." The provisional application Serial No. 60/122,170 filed on Feb. 26, 1999 and entitled "Bookmark System and Method Within An Intelligent Network" is also hereby incorporated by reference.

FIELD OF THE INVENTION

This invention relates to the field of telecommunications communications systems. More particularly, this invention relates to the field of voice telecommunications systems employing intelligent networks.

BACKGROUND OF THE INVENTION

Currently, there are two basic types of services which are implemented within a telecommunications network. These two types of services include Intelligent Network services and non-Intelligent Network services. Intelligent Network services improve upon non-Intelligent Network services by allowing a telecommunications service provider to introduce new services or modify existing services throughout the network without physical intervention. Further, Intelligent Network services also allow integration of commercially available software to create needed applications. Finally, Intelligent-Network services create open interfaces which allow applications to interface with equipment and software from different vendors.

Both the Intelligent Network services and non-Intelligent Network services presently allow a user to utilize an initial server which supports a voice mail system, and then at any time while connected to this initial server, the user can switch to a subsequent server which supports a dial out system. Unfortunately, both the Intelligent Network services and non-Intelligent Network services have disadvantages.

For non-Intelligent Network services, the application is often implemented on a server which is an adjunct processor to the switch. To access an initial server, a call is routed by the telecommunications network to the initial server. This call is then answered by the initial server, and the initial server is initiated from a beginning state. During the course of interaction between a user and the initial server, the user can elect to connect with a subsequent server or be automatically transferred to the subsequent server as required due to service needs. If this subsequent server is initiated, the call is then routed to the subsequent server. The initial server attempts to emulate the switch functionality by routing the call through the initial server and to the subsequent server.

For Intelligent Network services, the application is also often implemented in a server which is also an adjunct to the switch. This server is often referred to as the Intelligent Peripheral. Similar to the non-Intelligent Network services, to access an initial server, a call is routed by the telecommunications network to the initial server. However, when a user wishes to access a subsequent server, the Intelligent Network services provides a standard protocol to completely transfer the call from the initial server to the subsequent server. The disadvantage of this implementation is that when the call is transferred from the initial server to the subsequent server, the user cannot seamlessly return to the same state in the initial server. Instead, when the user returns to the initial server, the user is placed back at a beginning state of the initial server. Once the connection to the subsequent server is terminated, the Intelligent Network provides no mechanism to return to the same state within the initial server and continue interacting with the initial server at the same state where the user last left off.

FIG. 1 illustrates an interaction between a signal control point (SCP) 400, a service switching point (SSP) 405, and a server 410 on a prior art Intelligent Network service. First, at the step 415, a calling party dials an access number and connects with the SSP 405. At the step 420, the SSP 205 is then triggered to query the SCP 400. Next, at the step 425, the SCP 400 instructs the SSP 405 to access the server 410 using a Send to Resource command.

At step 430, the SSP 405 connects the calling party to the server 410 preferably via an ISDN user part (ISUP) signaling. It will be apparent that other signaling protocols can be used. Next, at the step 435, the calling party begins interaction at the beginning of a service on the server 410. At the step 440, the calling party or the server 410 requests to be transferred to a different server.

At the step 445, the SSP 405 sends the server 410 an RLC command. Next, at the step 450, the SSP 405 sends the SCP 200 a Resource Clear command. At the step 455, the SCP 400 sends the SSP 405 a Forward Call command. Next, at the step 460, the calling party interacts with a different server during a Mid-Call Trigger. At the step 465, the calling party requests to be transferred back to the server 410, and the SCP 400 sends the SSP 405 a Send to Resource command. Similar to the step 430, at the step 470, the SSP 405 then connects the calling party to the server 410. At the step 475, the calling party begins interaction with the service on the server 410 at the beginning and begins interaction with the program therefrom. Often this results in frustration for the user at having to repeat interactive steps previously undertaken. The SCP 400, SSP 405, and the server 410 do not have the capability to seamlessly and automatically return a user to a same state within a server after the user has already terminated communication with this server.

What is needed is a system within an Intelligent Network service that allows a user to return to a previous state in a previous telecommunications server upon termination of an interaction with a subsequent server. What is further needed is a system within an Intelligent Network service that upon returning to a server, automatically places a user back to the same state within the server which corresponds to the state that existed when the user was forwarded to a subsequent server.

SUMMARY OF THE INVENTION

The present invention is a bookmark system and method that automatically stores a subaddress which is associated with a particular user and represents a state of a server when the user exits the server. This subaddress preferably indicates a particular state within the server when the user exited the server. This bookmark system and method preferably returns this subaddress to the server when the user reconnects to this server. As a result, the bookmark system and method seamlessly places the user back to the same state within the server when the user reconnects to the server. The bookmark system and method is preferably configured to operate within an Intelligent Network service. By utilizing the bookmark system and method, the user is able to move from server to server and automatically return to the same state where the user previously exited the server. Further, the bookmark system and method does not require a call to be routed through a prior server in order for the user to return to the same state where the user previously exited the prior server.

The present invention provides a bookmark system and method which operates within an Intelligent Network service. Additionally, the present invention provides a bookmark system and method which automatically stores a location where a user exits an application. Finally, the present invention provides a bookmark system and method which seamlessly returns the user to a same location where the user exited an application.

BRIEF DESCRIPTION OF THE DRAWINGS

FIG. 1 illustrates a timing diagram of showing steps of a prior art telecommunications system.

FIG. 2 illustrates a general block diagram showing a telecommunications system containing a preferred embodiment of the present invention.

FIG. 3 illustrates a timing diagram of the preferred embodiment of the present invention.

FIG. 4 illustrates a flow chart showing a sample operation of the present invention interacting a voice messaging system.

DETAILED DESCRIPTION OF THE PREFERRED EMBODIMENT OF THE PRESENT INVENTION

FIG. 2 illustrates a diagram showing an Intelligent Network system 100 that includes the present invention therein. The present invention is a bookmark system which stores a subaddress which represents a state of a server before the user exits the server. For example, the user interacts with a present server. Then, the user leaves the present server. The bookmark system automatically stores a subaddress indicating a state within the server when the user left the present server. Further, upon the user returning back to the present server, the bookmark system automatically sends this subaddress to the present server. Once the present server receives the subaddress, the user is placed at the same state within the server. If the user enters a server for a first time during a call, the bookmark system preferably sends this server a subaddress which instructs this server to start the user at a beginning state within the server. The subaddress can be represented in a string of bits with varying lengths depending on the requirements of the particular server. The term subaddress is exemplary only. The information that is stored should be that information that is necessary and sufficient to return the user to the initial server at the same point where it was when exited.

The Intelligent Network system 100 includes a service control point (SCP) 110; a signaling system No. 7 (SS7) Network 120; a service switching point (SSP) 130; a server 140; a server 150; ISDN user part (ISUP) links 160, 161, and 162; control links 170, 171, 172, and 173; a calling party 180; and a bookmark system 145 and 155. Portions of the Intelligent Network system 100 are illustrated for exemplary purposes only. For example, it would be apparent to those skilled in the art to utilize any number of SCPs, SSPs, servers, and calling parties. It would also be apparent to those skilled in the art to utilize appropriate control links, data links, and SS7 networks to create a functional Intelligent Network.

The bookmark system 145 and 155 preferably reside within the SCP 110. However, it could be implemented by any available hardware, or as software running on any convenient CPU. The SCP 110 preferably acts as a coordinator between elements within the Intelligent Network system 100. The bookmark system 145 preferably stores a subaddress associated with a particular user and a state within the server 140 when the particular user jumps to exits the server 140. Similarly, the bookmark system 155 preferably stores a subaddress associated with a particular user and a state within the server 150 when the particular user exits the server 150.

The control links 170, 171, 172 and 173 provide communication links between the SCP 140 and the SS7 Network 120; the SS7 Network 120 and the server 150; the SS7 Network 120 and the server 140; and the SS7 Network 120 and the SSP 130. The ISUP links 160, 161, and 162 provide data links between the calling party 180 and the SSP 130; the SSP 130 and the server 150; and the SSP 130 and the server 140.

FIG. 3 illustrates a timing diagram according to which the present invention operates to implement a bookmark system 280. The bookmark system 280 is preferably associated with a particular calling party and a particular server. Preferably, the bookmark system 280 stores a subaddress which represents a last state of the particular calling party's interactions before jumping to leave the particular server. The bookmark system 280 is described in context with the overall functionality of an Intelligent Network service. As shown in FIG. 3, the timing diagram illustrates interaction between an SCP 200, an SSP 205, and a server 210, and the bookmark system 280. The bookmark system 280 is preferably located within the SCP 200.

First, at the step 215, a calling party dials an access number and connects with the SSP 205. At the step 220, the SSP 205 is then triggered to query the SCP 200. Next, at the step 225, the SCP 200 instruct the SSP 205 to access the server 210 using a Send to Resource command. At the step 230, the SSP 205 connects the calling party to the server 210 via ISUP signaling, and the bookmark system 380 sends a subaddress to the server 210. In this case, the subaddress represents a state within the server 210 when the calling party exits the server 210. At the step 235, the server 210 begins at the subaddress which is received by the bookmark system 280 in the step 230. For example, if this is the first time the calling party connects with the server 210, then bookmark system 280 preferably directs the server 210 to start at a beginning state within the server 210. However, if the calling party left the server 210 while at a particular state within the server 210, then upon reconnecting with the server 210, the bookmark system 280 preferably sends the subaddress (which was previously stored in the bookmark system 280) to the server 210 directs the server 210 to begin at this particular state within the server 210.

At the step 240, the calling party or the server 210 requests to be transferred to another server. Before the calling party exits the server 210, the bookmark system 280 preferably stores a subaddress which represents a state within the server 210 when the calling party exited the server 210. By saving the state of the server 210 as a subaddress, the bookmark system and method 280 is capable of initiating the server 210 at this same state when the calling party re-enters the server 210 at a future time.

At the step 245, the SSP 205 sends the server 210 an RLC command. Next, at the step 250, the SSP 205 sends the SCP 200 a Resource Clear command. At the step 255, the SCP 200 sends the SSP 205 a Forward Call command.

At the step 260, the calling party interacts with a subsequent server, and the SSP 205 sends a Mid-Call Trigger command to the SCP 200. At the step 265, the calling party requests to be transferred back to the server 210, and the SCP 200 sends the SSP 205 a Send to Resource command. Similar to the step 230, at the step 270, the SSP 205 connects the calling party to the server 210 and the bookmark system 280 sends the subaddress to the server 210. This subaddress represents a state in the server 210 when the calling party exited the server 210. At the step 270, the sever 210 is initiated at the same state before the user left the server 210 in the step 240. In this example, the calling party exited the server 210 at the step 240. At the step 275, the calling party continues interaction from this same state within the server 210.

The server 210 can function as a voice messaging system, a billing system, a paging system, or the like. It will be apparent to those skilled in the art that steps may be deleted or substituted with other steps and that other steps may be added without changing the scope of the present invention as described in FIG. 3.

FIG. 4 illustrates a flow chart showing a sample operation of the present invention within a voice messaging system. Steps within this flow chart which demonstrate functions of the voice messaging system are not part of the present invention. Steps involving the voice messaging system are intended to merely illustrate a functional example of the present invention. Accordingly, the bookmark system and method can be utilized with any type of function or service. The bookmark system and method allows the user to seamlessly move back and forth from one service to another on an Intelligent Network while beginning at a location where the user left off when revisiting a prior service.

As shown in FIG. 4, the flow chart begins at the step 300 where the voice messaging system is initiated. Next, at the step 310, the bookmark system directs the voice messaging system to begin at a subaddress which is stored within the bookmark system. The subaddress represents a location where the user left off when previously exiting the voice messaging system. In this present example, the user has not visited the voice messaging system. Accordingly, at the step 320, the voice messaging system begins by playing an introductory greeting. Next, at step the 325, a first message is played back. After the step 320, the user indicates a desire to respond to this first message. Next, at the step 330, the bookmark system saves a subaddress representing a location where the user exits the voice messaging system. Then, at the step 340, the user exits the voice messaging system.

At the step 350, a dial up function is initiated. In this case, the dial up function is not equipped with the bookmark system and method. However, it will be apparent to those skilled in the art to utilize the bookmark system with the dial up function. Next, at the step 360, the user is connected with a sender of the first message. After the step 360, the user exits the dial up function at the step 370. Next, the voice messaging system is initiated at the step 380. Similar to the step 310, the bookmark system sends the subaddress which represents the location where the user most recently left offjust before exiting the voice messaging system. In this case, the subaddress sent by the bookmark system 280 indicates that the user left off after listening to the first message. Accordingly, because the voice mail system received the subaddress from the bookmark system 280, the voice mail system automatically skips the introductory greeting and the first message and immediately begins by playing a second message at the step 400.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the bookmark system and method disclosed above is only illustrative of the preferred embodiment of the invention and is in no way a limitation.

What is claimed is:

1. A voice telecommunication system to allow a user to engage in voice communication comprising:
   a. a first server coupled to receive a voice call from the user, the first server having a first predetermined set of application capabilities;
   b. a second server having a second predetermined set of application capabilities, where in the first server is coupled to transfer the user to the second server to take advantage of one of the second set of predetermined application capabilities,
   wherein the first server saves a user state of the first server such that the user is automatically placed into that user state upon being transferred back to the first server.

2. A voice telecommunications system having a control point configured for allowing a user to sequentially couple to two or more independent servers further comprising: a subaddress stored in the control point for each independent server and configured for saving a state for each of independent server such that when the user terminates communication with a selected one of the independent servers, the system returns the independent server to the same state once communication between the user and the independent server is re-established.

3. The system according to claim 2 further comprising a detector configured for uniquely identifying the user.

4. The system according to claim 2 further comprising a locator coupled to the subaddress for returning the user to the state when communication between the user and independent server is re-established.

5. A method of storing a subaddress within-a control point of a voice telecommunications system having a plurality of independent servers, the steps comprising:
   (1) initiating a first one of the plurality of independent servers;
   (2) interacting with the first one of the plurality of independent servers;
   (3) storing the subaddress within the control point wherein the subaddress corresponds to the step of interacting;
   (4) terminating communication with the first one of the plurality of independent servers; and
   (5) re-initiating communication with the first one of the plurality of independent servers and automatically beginning at the subaddress.

6. A method of implementing a bookmark system within a control point of an intelligent network having an independent server, the steps comprising:
   (1) initiating the independent server; and
   (2) automatically storing the a subaddress within the control point prior to completely severing communication with the independent server thereby forming a bookmark subaddress, wherein the subaddress defines a state of the independent server when communication is severed.

7. The method according to claim 6 the steps further comprising:

(1) checking the bookmark subaddress;

(2) re-initiating the independent server; and (3) automatically entering the independent server at the bookmark subaddress when re-initiating the independent server.

8. A method of implementing a bookmark system within a control point of an intelligent network having an independent server, the steps comprising:

(1) automatically storing a state of the independent server on the control point prior to severing communication between the control point and the independent server;

(2) automatically sending the state from the control point to the independent server upon re-establishing communication between the control point and the independent server; and (3) initiating the independent server to begin at the state upon re-establishing communication between the control point and the independent server.

* * * * *

UNITED STATES PATENT AND TRADEMARK OFFICE
CERTIFICATE OF CORRECTION

PATENT NO. : 6,782,089 B1
DATED : August 24, 2004
INVENTOR(S) : Blackburn et al.

It is certified that error appears in the above-identified patent and that said Letters Patent is hereby corrected as shown below:

Title page,
Item [75], Inventors, the third inventor "Douglas William Varney" is from
-- Naperville, IL (US) --

Column 2,
Line 12, replace "At the step 420, the SSP 205" with -- At the step 420, the SSP 405 --.
Lines 24-25, replace "sends the SCP 200" with -- send the SCP 400 --.

Column 4,
Line 38, replace "bookmark system 380" with -- bookmark system 280 --.
Line 42, replace "is received by" with -- is received from --.
Line 51, between "the server 210" and "directs" add -- which --.

Column 5,
Line 8, replace "At the step 270, the sever 210" with -- At the step 270, the server 210 --.
Line 42, replace "After the step 320" with -- After the step 325 --.
Line 57, replace "offjust" with -- off just --.

Column 6,
Line 65, replace "storing the a subaddress" with -- storing a subaddress --.

Signed and Sealed this

Twelfth Day of October, 2004

JON W. DUDAS
*Director of the United States Patent and Trademark Office*